United States Patent [19]

Poran

[11] 3,727,498
[45] Apr. 17, 1973

[54] ROTARY SHEAR

[75] Inventor: Michael Poran, New York, N.Y.

[73] Assignee: Daniels and C.S.p.A., Buttrio(Udine) Italy

[22] Filed: Sept. 10, 1971

[21] Appl. No.: 179,472

[30] Foreign Application Priority Data

June 28, 1971 Germany......................P 21 32 125.5

[52] U.S. Cl.........................83/106, 83/165, 83/303, 83/306, 83/343, 83/444, 83/479, 83/497
[51] Int. Cl...........................B23d 19/04, B26d 7/06
[58] Field of Search......................83/496, 497, 500, 83/503, 102, 105, 157, 165, 288, 343, 344, 438, 444, 479, 482, 303, 306, 519

[56] References Cited

UNITED STATES PATENTS

| | | | |
|---|---|---|---|
| 3,491,640 | 1/1970 | Poran | 83/497 X |
| 1,426,216 | 8/1922 | Roberts et al. | 83/497 X |
| 2,664,950 | 1/1954 | Morgan et al. | 83/482 |
| 2,881,835 | 4/1959 | Morgan | 83/343 X |
| 3,258,951 | 7/1966 | Kinnicutt, Jr. et al. | 83/105 X |

*Primary Examiner*—Andrew R. Juhasz
*Assistant Examiner*—James F. Coan
*Attorney*—Craig and Antonelli

[57] ABSTRACT

Two pairs of discs mounted on mutually inclined shafts each have concentric cutting edges on opposed faces, one pair of discs being mounted generally edge-to-edge in relation to the other pair. The discs are movable, so that the cutting edges of one pair form a cutting zone at one peripheral location while those of the other pair are spaced to form a gap, and vice versa. Stock to be cut is fed tangentially into the general area of these zones, its path of travel being moved radially outwardly of the discs forming a cutting zone and through the gap in the other pair of discs, this direction of movement then being reversed, after the disc positions have been reversed, and so on, thus enabling a series of cuts to be made.

6 Claims, 3 Drawing Figures

INVENTOR
MICHAEL PORAN
BY Craig, Antonelli & Hill
ATTORNEYS

3,727,498

ROTARY SHEAR

This invention relates to a rotary shear.

The object of this invention is to provide a rotary shear having a mode of operation that is well adapted to the cutting of rolled stock or any other continuously supplied elongated material, such operation being particularly adapted to high speeds.

In may application Ser. No. 179,492 filed concurrently herewith, there is described a rotary shear comprising a pair of discs each having at least one circumferentially extending cutting edge, the discs being mounted generally face-to-face on mutually inclined shafts so that the cutting edges closely oppose each other at one peripheral location to form a cutting zone. Stock to be cut is fed generally tangentially into the general area of this zone and the path of travel of the stock is arranged to be movable radially outwardly through the cutting zone so that the stock is cut therein.

However, since the shear can only cut when the path of travel of the stock is moved radially outwardly through the cutting zone, if a second cut is required, either a second shear is needed or the discs must be moved apart so that the stock can be reinserted between them at a location radially inward of the cutting zone. Both expedients are undesirable.

It is accordingly a further object of the present invention to provide a shear in which this difficulty is overcome.

BRIEF SUMMARY OF THE INVENTION

To this end the invention comprises a second pair of discs similar to the first pair. The discs of the second pair are mounted in a generally edge-to-edge relationship with the respective discs of the first pair. Each pair is movably mounted so as either to form a cutting zone or a gap that is large enough to allow the stock to pass through it.

A directing element is provided for feeding the stock generally tangentially into the general area of the cutting zones. This element is movable so as to be able to cause the path of travel of the stock to be moved radially outwardly of the first pair of discs while this pair forms a cutting zone and the second pair forms a gap, thus forming a first cut, and then to reverse its direction of motion to cause the path of travel of the stock to be moved radially outwardly of the second pair of discs after these have been moved together to form a cutting zone and the first pair has been opened up to provide a gap. In this way a series of cuts can be taken merely by reversing the direction of movement of the directing element.

In a preferred embodiment of the invention, the shear comprises two housing on each of which one disc of each pair is mounted, the housings being tiltable about substantially equal angles, the axes of the discs mounted on one housing forming an angle which is greater than the cutting angle; this means that the discs of the opened pair subtend a greater angle than the discs that perform the next cutting. This arrangement allows a particularly simple and compact construction.

Preferably, the two axes about which the housings are tiltable lie on a straight line that passes through the location at which the pairs of discs each have the minimum spacing apart of the cutting edges, i.e. form a cutting zone. As a result of this feature, the forces exerted during cutting pass substantially through the tilting axes of the housings so that only minimal external torsional moments are produced tending to cause changes in the positions of the housings. The actuating elements for tilting the housings may thus be of light structure.

The driving of the discs mounted on one housing can be solved in a particularly simple manner, these discs being commonly driven — preferably through bevel gears.

Catching and guiding elements are preferably associated with the zones between each pair of discs, these two elements leading to a common distributor. As a result, all sections of the rolled stock can be made to arrive at the same location and can then be delivered in the desired directions by the common distributor. Preferably, the distributor comprises a further directing element that is movable to project its outlet into several different directions. Thus, a particularly universal shear is provided, which can serve simultaneously as a cropping shear, a dividing shear and a scrap shear. The various sections of the useful length of the rolled stock can, in addition, be fed to several locations by means of the same distributor.

BRIEF DESCRIPTION OF THE DRAWINGS

Further details of the shear according to the invention will become apparent from the following detailed description of a preferred embodiment with reference to the drawings, in which.

DETAILED DESCRIPTION OF EMBODIMENT

Figure 1:
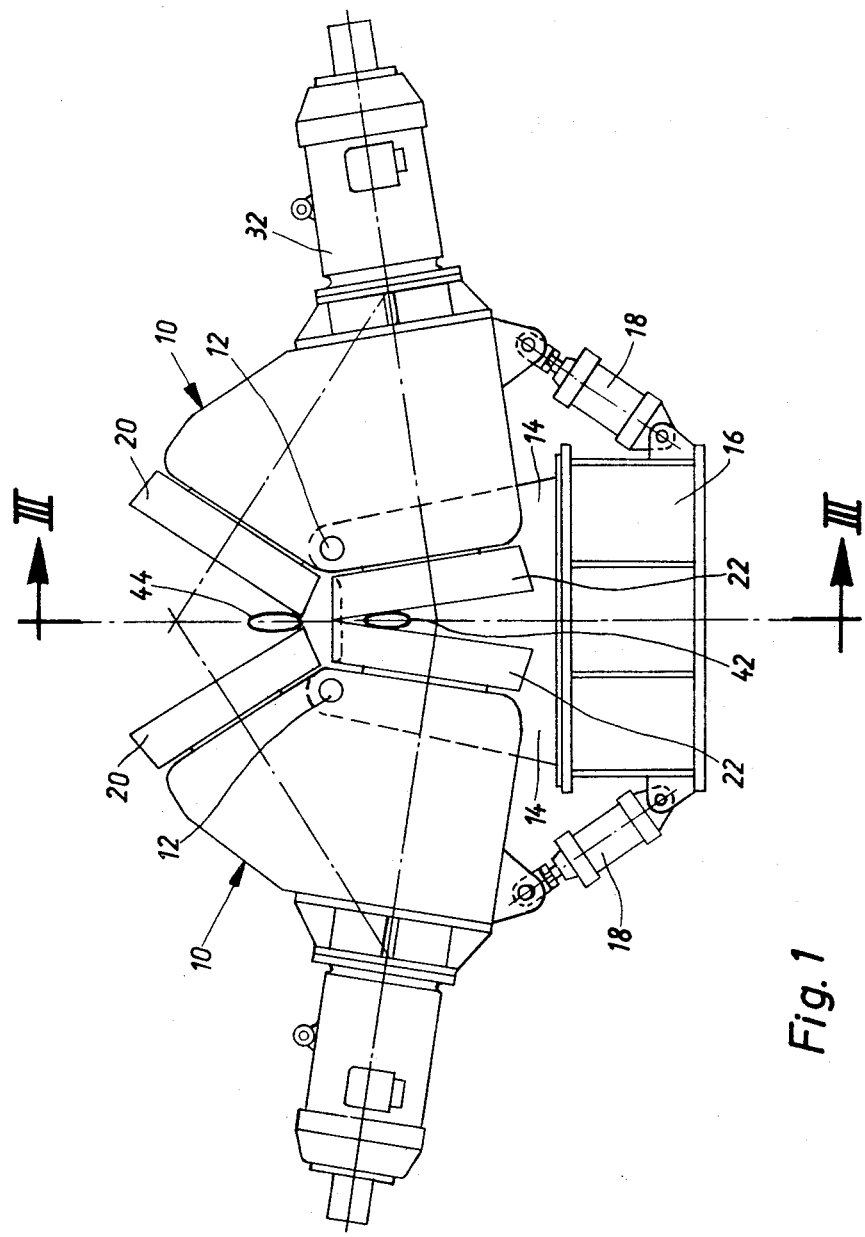
FIG. 1 shows a shear according to the invention as viewed in the direction of movement of the rolled stock.

According to FIG. 1, the shear comprises two identical housings 10 which are mounted on brackets 14 so as to be tiltable about pivot points 12, the brackets 14 being mounted on a base 16. An actuating cylinder 18 is mounted on each side of the base 16, the end of the piston rod of each cylinder being articulated to a respective housing 10.

Figure 2:
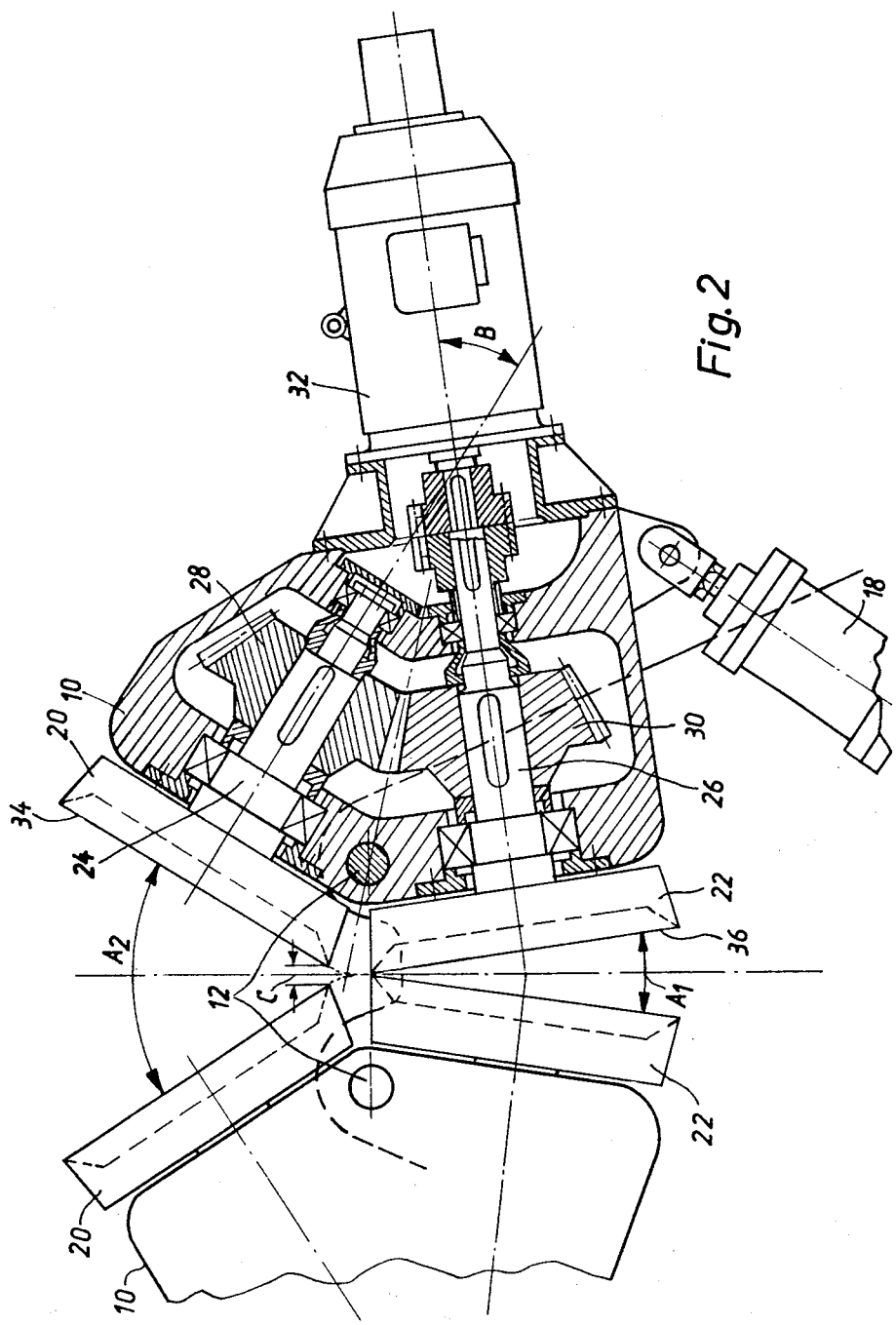
FIG. 2 is an enlarged fragment of FIG. 1 showing a section through one of the two housings.

As shown in FIGS. 1 and 2, two discs 20, 22 are mounted on each housing 10 by means of shafts 24, 26 which are geared together through bevel gears 28, 30. The shaft 26 is driven through a coupling from a motor 32. The axes of the two shafts 24, 26 form an angle B between them.

As indicated by the broken lines in FIG. 2, the discs 20, 22 are provided on their front rims with circular cutting edges 34,36. These cutting edges may either form integral portions of the discs or may be fixed thereto as separate rings.

In the position shown in FIGS. 1 and 2, the discs 22, which form a lower cutting unit, enclose an angle A1 that is called the cutting angle and which is smaller than the angle B between the shafts 24 and 26; accordingly. The angle A2 which is enclosed by the discs 20 which form an upper cutting unit is also greater than the angle A1.

The location where the actual cutting takes place is the location of the closest approach of the two opposing cutting edges 36 (in the position of FIGS. 1 and 2) or of the edges 34 (in the other tilted position i.e. cylinders 18 expanded). The pivot points 12 about which the housings 10 tilt are so located that the line joining them passes through such location.

The distance between the two pivotal points 12 and the opening angle A2 between the inoperative discs that are not for the time being in shearing position are such that the gap C between the cutting edges of these inoperative discs is sufficient to enable the rolled stock to pass through. The angles are related in accordance with the equation:

$$B = (A1 + A2/2).$$

Figure 3:
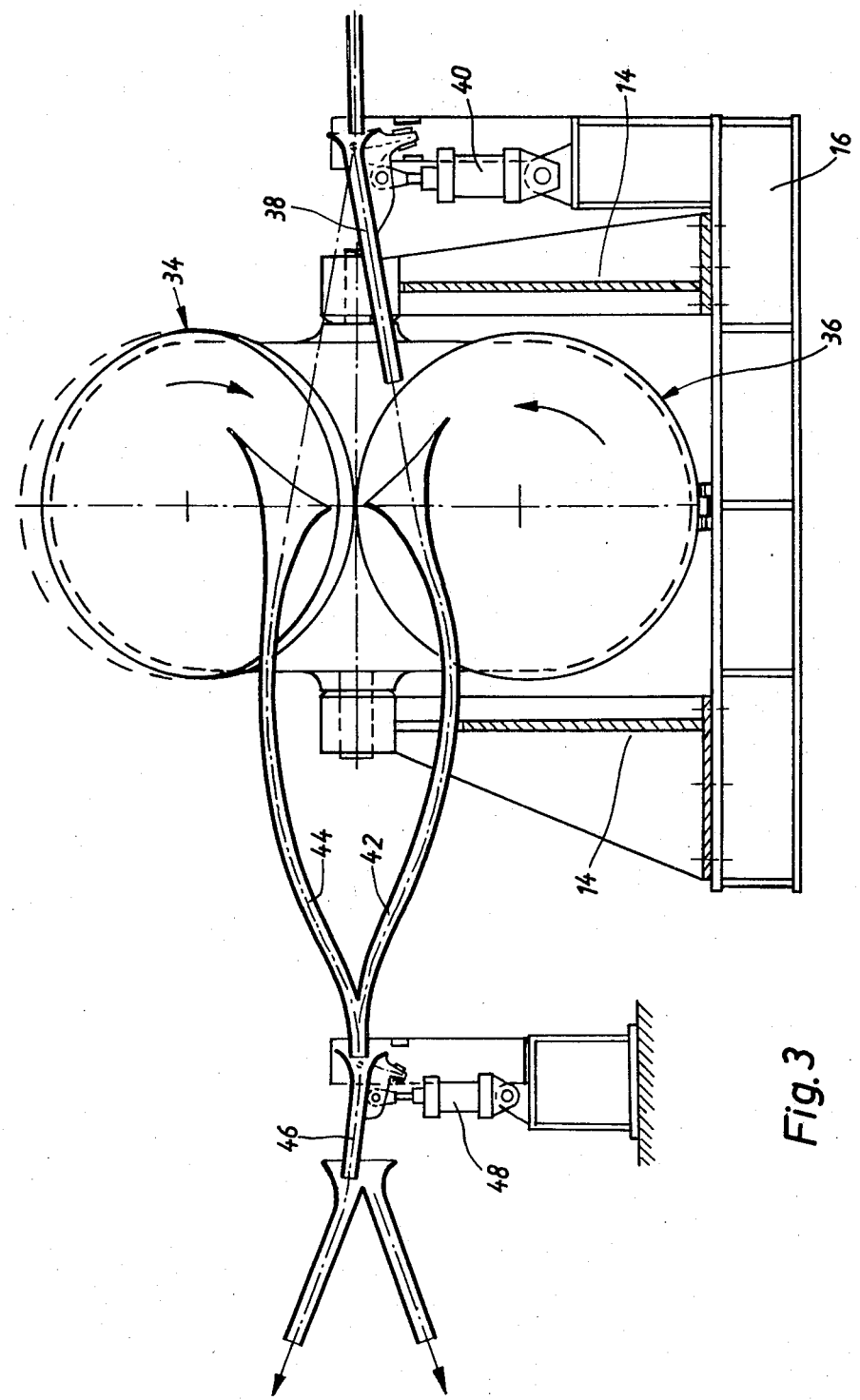
FIG. 3 is a section through the device along the lines III—III of FIG. 1.

As shown in FIG. 3, a directing element 38 is arranged at the inlet side of the shear, this element being tiltable about a point close to its funnel-shaped inlet opening. An actuating cylinder 40 serves to move the element 38 between upper and lower operative positions. In the lower position, the element 38 directs elongated stock in a path of travel extending into the zone between the lower discs 22; in the upper position, it directs the stock into the zone between the upper discs 20.

On the other side of the apparatus, a first catching and guiding element 42 has a mouth located in the zone between the lower discs 22, and a further catching and guiding element 44 is similarly associated with the zone between the upper discs 20. The two catching and guiding elements may be identical and disposed symmetrically to each other. They both terminate at a funnel-shaped inlet opening of a further directing element 46 which is tiltable by an actuating cylinder 48 to direct the stock to one of two further passageways.

In the operation of the shear, the stock is first fed with the directing element 38 in the position shown in FIG. 3, i.e. into the zone between the lower discs 22 and through the catching and guiding element 42. If the directing element 38 is now tilted to its upper position by actuation of the cylinder 40, the path of travel of the stock moves upwards to pass firstly through the cutting zone between the cutting edges 36 of the lower pair of discs 22 and then through the gap C between the upper pair of discs 20. While passing the cutting zone the stock is severed and the new tip thus produced is transferred to the upper catching and guiding element 44.

The two housings 10 are then tilted relatively to each other about the points 12 by actuating the cylinders 18, so that now the upper discs 20 form the cutting angle A1 and the lower discs 22 form the greater angle A2. The position of the discs has thus been interchanged.

If the directing element 38 is now moved to its lower position the same cutting process is performed during its downward travel.

The sections received by the elements 42 and 44 proceed to the common directing element 46 and may be delivered by this element selectively to a scrap bucket or to one or several further processing devices. While the direction element 46 is shown in FIG. 3 as having only two operative positions, three or more positions can be provided.

The above shear has been described as particularly suited for cutting rolled stock moving at high speed; however, it can be used for cutting any continuously supplied material.

I claim:

1. A rotary shear comprising
   a. a first pair of discs each having a circumferentially extending cutting edge on a face thereof,
   b. means mounting said discs in a generally face-to-face relationship for rotation about a first pair of axes inclined to each other to locate said cutting edges closely opposed to each other at a first peripheral location and spaced apart from each other at other peripheral locations around said discs to form a first cutting zone at said first peripheral location,
   c. a second pair of discs each having a circumferentially extending cutting edge on a face thereof,
   d. means mounting said second pair of discs in a generally edge-to-edge relationship with respective discs of the first pair and in a generally face-to-face relationship with each other for rotation about a second pair of axes inclined to each other to locate said cutting edges narrowly spaced apart at a second location to form a first gap and widely spaced apart at other peripheral locations around said second pair of discs, said second peripheral location being in the vicinity of said first peripheral location,
   e. means for moving said second pair of discs towards each other to bring the cutting edges thereof closely opposed to each other at said second peripheral location to form a second cutting zone while retaining the other peripheral locations around said second pair of discs spaced apart from each other,
   f. means for moving said first pair of discs away from each other to open a second gap between the cutting edges at said first peripheral location, and
   g. directing means for directing stock generally tangentially into the general area of said cutting zones, including means for moving said directing means to cause the path of travel of the stock to be movable in a first direction extending radially outwardly through the cutting zone of one pair of discs and the gap of the other pair of discs and in the reverse direction extending radially outwardly through the cutting zone of said other pair of discs and the gap of said one pair of discs.

2. A shear according to claim 1, wherein said mounting means (b) and (d) together comprise tiltably mounted housings, and wherein said moving means (e) and (f) together comprise means for simultaneously tilting said housings relatively to each other in one direction to move said first pair of discs into position to form said first cutting zone and said second pair of discs into position to form said second gap and in the reverse direction to move said second pair of discs into position to form said second cutting zone and said first pair of discs into position to form said first gap.

3. A shear according to claim 2, wherein said housings are tiltable about axes parallel to each other, both said cutting zones being located on a line transverse to said housing axes extending between them.

4. A shear according to claim 2, wherein each said housing includes means for commonly driving one disc of each pair in opposite directions to each other.

5. A shear according to claim 1, including catching and guiding elements for receiving stock fed by said directing means between respective pairs of discs, said elements feeding the stock to a common distributor.

6. A shear according to claim 5, wherein said distributor feeds the stock to a further directing element that is movable to several distributing positions.

* * * * *